United States Patent

Borchers et al.

[11] Patent Number: 6,108,616
[45] Date of Patent: Aug. 22, 2000

[54] PROCESS DIAGNOSIS SYSTEM AND METHOD FOR THE DIAGNOSIS OF PROCESSES AND STATES IN AN TECHNICAL PROCESS

[75] Inventors: Hans-Werner Borchers, Heidelberg; Ralf Otte, Weinheim; Rainer Speh, Weiterstadt; Claus Weisang, Leimen, all of Germany

[73] Assignee: ABB Patent GmbH, Mannheim, Germany

[21] Appl. No.: 09/123,079

[22] Filed: Jul. 27, 1998

[30] Foreign Application Priority Data

Jul. 25, 1997 [DE] Germany .............................. 197 32 046

[51] Int. Cl.[7] .............................. G05B 15/02; G05B 19/42
[52] U.S. Cl. .............................. 702/183; 702/185; 714/26; 706/10; 706/907; 700/51; 700/286
[58] Field of Search .................................... 702/183, 185, 702/182, 189, 57–59; 700/51, 286; 73/61.48; 706/10, 907; 714/26

[56] References Cited

U.S. PATENT DOCUMENTS 6,041,287  3/2000  Dister et al. .............................. 702/182

Primary Examiner—Kamini Shah
Attorney, Agent, or Firm—Herbert L. Lerner; Laurence A. Greenberg; Werner H. Stemer

[57] ABSTRACT

The invention relates to a process diagnosis system and a method for the diagnosis of processes and states in a technical process, in particular for the diagnosis of a power station process. The invention is a structured multi-agent system which corresponds to the process and has a plurality of autonomous diagnostic agents. The diagnostic agents in each case contain a neural network, with whose aid a reference behavior of process components that are to be monitored can be learned. In addition, automatic adaptation to a new reference behavior is also possible by the diagnostic agents.

8 Claims, 6 Drawing Sheets

PROCESS DIAGNOSIS SYSTEM AND METHOD FOR THE DIAGNOSIS OF PROCESSES AND STATES IN AN TECHNICAL PROCESS

BACKGROUND OF THE INVENTION

FIELD OF THE INVENTION

The invention relates to a process diagnosis system and a method for the diagnosis of processes and states in a technical process. The method is, in particular, suitable for the diagnosis of processes and states of a power station plant.

In technical plants, it is generally known to carry out process diagnosis on the basis of acquired measurement signals. In known technical plants the actual measurement and data acquisition is realized decentrally. The subsequent diagnosis is carried out centrally in a process computer.

Furthermore, a plurality of procedures for carrying out technical diagnoses and process management are known. Novel types of approaches for advanced diagnosis are aimed at the integration of knowledge-based systems into process control technology. Such a system emerges from M. Polke, Prozeßleittechnik, Kapitel 'Integration Wissensbasierter Systeme in die Leittechnik, [Process Control Technology, Chapter on "Integration of Knowledge-Based Systems into Process Control Technology"], pp. 813 ff., Oldenbourg Verlag, 1994. In general, a diagnosis is carried out in several steps: fault detection, fault localization and fault cause determination. So-called alarm re ports, which are combined into alarm hierarchies, are widespread. Higher-quality forms of diagnosis are currently carried out in central, complex application programs, for example by expert systems.

The disadvantage of simple diagnostic methods based on alarm hierarchies is the inadequate fault detection and fault cause determination. In particular for a diagnosis in the case of transient processes, it is not sufficient to work using static error limits. In order to eliminate this problem, process-state dependent reference models were introduced. The reference models prescribe the expected set point and a maximum permissible deviation from the set point as a function of the current process state. If a deviation is detected, a downstream fault localization system calculates the fault location and the fault cause. Typically, this form of expanded process diagnosis is carried out by model-based or rule-based expert systems, such as those published, for example, in "Das Expertensystem MODI" ["The MODI Expert System"] in ABB Technik/6, 1994 (pages 38 to 46).

The disadvantages of the dynamic diagnostic method are, first, on account of the diagnosis being carried out centrally and because not all the process variables are available centrally, the diagnostic capability for specific plant components are limited. Second, the high engineering outlay to build up the reference models. Third, the high outlay in order to adapt the fault trees or rules for the fault causes to the respective plant. A further disadvantage of previous diagnostic applications is their inflexibility. More precisely, after changes are made to the plant, the diagnostic system has to be readjusted to account for the changes. In previous diagnostic applications, automatic adjustments are not possible.

SUMMARY OF THE INVENTION

It is accordingly an object of the invention to provide a process diagnosis system and a method for the diagnosis of processes and states in a technical process which overcome the above-mentioned disadvantages of the prior art devices and methods of this general type, in which a simultaneous reduction in the commissioning and engineering costs of the overall diagnostic system is achieved. A further objective is to specify a method for an adaptive diagnosis to such that the diagnostic system itself is able to detect changes in the plant and adjust itself in accordance to the changes.

With the foregoing and other objects in view there is provided, in accordance with the invention, a process diagnosis system for the diagnosis of processes and states of a technical process controlled by a process control system having a plurality of components, the process diagnosis system including: a multi-agent system structured in accordance with a process and having a plurality of autonomous diagnostic agents distributed over a plurality of components of the process control system controlling a process; the diagnostic agents each have a sensor module for the acquisition of process values and messages from the process control system, an actuator module for reacting on the process, a communications module for exchanging information between the diagnostic agents, an intentions module for storing task and objective programs of the diagnostic agents, and a processing module connected to the sensor module, the actuator module, the communications module and the intentions modules, the processing module storing a process model, storing information about the process and diagnostic tasks and carrying out diagnostic functions; and the processing module has an integrated neural network for learning a reference behavior of the components of the process being monitored and for enabling automatic adaptation to a new reference behavior.

In accordance with an added feature of the invention, some of the diagnostic agents are integrated into some of the components forming intelligent field instruments.

In accordance with an additional feature of the invention, the neural network is a network for enabling adaptation of process changes wherein the process changes can be learned automatically without losing relevant process relationships that have already been learned.

In accordance with another feature of the invention, the neural network is a locally approximating network.

In accordance with yet another added feature of the invention, the multi-agent system is for diagnosing processes and states of a power station process.

In accordance with yet another feature of the invention, the components of the process control system include field instruments and the actuator module prescribes at least one of set points and setting parameters of the field instruments.

With the foregoing and other objects in view there is also provided, in accordance with the invention, a method for carrying out a process diagnosis, which includes: providing a plurality of diagnostic agents to a process control system for monitoring process components of the process control system during a process, the diagnostic agents includes lower order diagnostic agents and a higher order diagnostic agent forming a multi-agent system; learning in a first commissioning phase reference behavior of the process components of the process to be monitored by each of the lower order diagnostic agents and storing the reference behavior as intended behavior; determining in an application phase actual behavior of the process components and comparing the actual behavior with the stored intended behavior by each of the lower order diagnostic agents; reporting any detected deviations in a form of deviation reports to the higher order diagnostic agent by each of the lower order diagnostic agents; carrying out a diagnosis in the higher order diagnostic agent on a basis of the deviation reports received from the lower order diagnostic agents and on reference behavior stored by the higher order diagnostic agent, and if no fault is detected, reporting with the higher order diagnostic agent to the lower order diagnostic agents that there is no fault present and that a reference model in at least one of the lower order diagnostic agents is to be adapted, if a fault is detected by the higher order diagnostic agent, reporting the fault with the higher order diagnostic agent to a superior higher order diagnostic agent thereof or outputting a fault report with a reporting device.

In accordance with a concomitant feature of the invention, there is the step of automatically adapting each of the lower order diagnostic agents to a new reference behavior if the higher order diagnostic agent releases an adaptation request to the each of the lower order diagnostic agents.

The diagnostic concept uses an approach which is based on the concept of a distributed process control system which allocates diagnostic tasks to autonomous and intelligent agents and provides the latter with an adaptive learning capability realized by the use of neural networks. Diagnostic tasks are then allocated precisely to the points where they can actually be carried out.

For such a diagnostic approach, the distribution of the diagnostic tasks has the advantage that it is not necessary for the complete process or the entire plant to be modeled, but in each case only a limited region. The distribution follows the components or grain sizes that are already present in the configuration, as a result of which important information from these regions can be transferred into the diagnosis. This considerably reduces the engineering outlay for the diagnostic system.

In the case of the inventive diagnostic system, the diagnostic capability is implemented in the form of a multi-agent system (MAS) in a control system. Here, the distribution of the individual autonomous software modules of the multi-agent system, the so-called diagnostic agents, is preferably and at least partially carried out directly on site in individual field instruments. The technique, and its subsequent adaptation, are made possible by the combination and improvement of the following novel techniques: field bus technologies, multi-agent systems and neural networks. The three technologies and their use for the inventive diagnostic method or system are explained briefly below.

The use of field bus technologies provides the possibility of integrating intelligent software modules (the diagnostic agents) directly into the intelligent field instruments. Since these diagnostic agents receive detailed information on site about the components to be investigated, reliable diagnosis becomes possible. Field bus technology is a technology which brings the intelligence of a monitoring system back into the field level. The main constituent of this technology is formed by intelligent actuators and sensors which communicate with one another via a field bus, as is described, for example, in "Bussysteme für die Prozeßleittechnik" [Bus Systems for Process Control Technology], chapter "Nutzen eines Feldbusses" [Benefits of a Field Bus], J. Rathje, VDE-Verlag, 1995, pages 91 to 111.

Building on the new capabilities of the field bus systems, the individual diagnostic modules in the intelligent field instruments are linked to one another. The interlinking is realized by the application of the technology of multi-agent systems, the necessary cooperation and communication between the agents being enabled by the multi-agent system.

Intelligent agents and multi-agent systems are a relatively new technology from the area of distributed artificial intelligence (DAI), as emerges, for example, from H. J. Müller, Verteilte Künstliche Intelligenz—Methoden und Anwendungen [Distributed Artificial Intelligence—Methods and Applications], pages 24 to 29 and pages 37 to 40, Bibliographisches Institut, Mannheim, 1993. An intelligent agent is to be understood as an autonomous software module that is able to distinguish its "environment" and execute tasks automatically. A multi-agent system includes a number of agents which communicate and cooperate with one another, in order to manage a common task, for example a process diagnosis.

The advantage of the method resides in the fact that an individual agent is in each case responsible for only a small section of the technical plant, so that the diagnosis can be carried out directly on site in the plant. Results from the diagnosis are passed on from the respective responsible agent to the diagnostic agent that is "next higher" in process control terms until, at an upper level, an overall diagnosis of the entire plant is made. The overall diagnosis is then reported further, for example to the process control computer in the control room.

The adaptability of the individual software agents is achieved by using the technology of neural networks within the individual agents on site. In the commissioning phase of the diagnostic system, the individual agents based on neural networks learn the intended behavior of their components, and hence they automatically build up a reference model of the existing plant. If the plant changes, for example as a result of aging phenomena or as a result of constructional measures, the diagnostic agent can detect the change and learn the new states of the plant. The learning process can be initiated automatically or triggered manually.

In the course of the operation of the plant, the existing knowledge can be built up further as a result of using neural networks. Preferably, neural networks which enable incremental learning are used. For instance, so-called radial basis function networks (RBF networks) can be built up for this purpose. An introduction to the theory of these RBF networks is given by A. Zell, "Simulation of Neural Networks", pages 225 to 239, Addison-Wesley Press, 1st Edition, 1994. RBF networks have the advantage that they approximate locally. It is hence possible to learn a new relationship—which is generally located within the extrapolation space of the network—newly in the network, without destroying existing knowledge bases. Use is made of this property in order to expand the knowledge base of a network incrementally.

Other features which are considered as characteristic for the invention are set forth in the appended claims.

Although the invention is illustrated and described herein as embodied in a process diagnosis system and method for the diagnosis of processes and states in a technical process, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
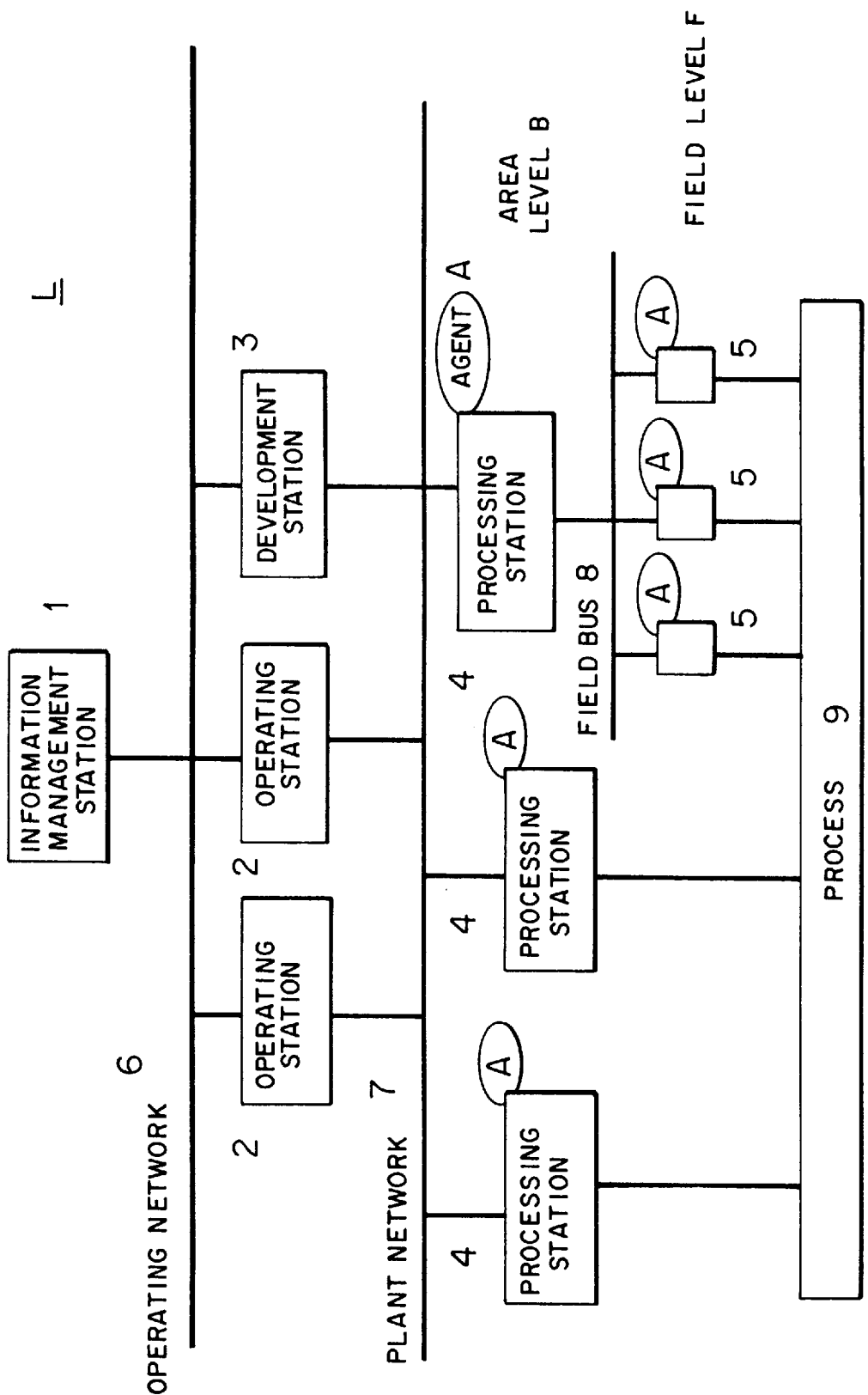
FIG. 1 is a block diagram of a control system having integrated diagnostic agents.

Referring now to the figures of the drawing in detail and first, particularly, to FIG. 1 thereof, there is shown the structure of a distributed control system L for the control and regulation of a process 9. The distributed control system L has several levels, in particular a field level F and an area level B. The distributed control system L is formed of aggregates or subsystems including an information management station 1, operating stations 2, a development station 3, processing stations 4 and field instruments 5. Communication between levels takes place via an operating network 6, a plant network 7 and a field bus 8.

In addition, and by way of example, the integration of diagnostic agents A into the distributed control system L are shown in FIG. 1. The diagnostic agents A are realized at various levels in the distributed control system L, in particular at the field level F as part of intelligent field instruments 5, and on the area level B as part of the processing stations 4. At the field level F, the diagnostic agent A is mainly entrusted with the early detection of fault causes on the basis of component faults. For example, a defective valve is diagnosed as a fault cause. At a higher-order level, the diagnostic agent observes an area, for example a container system or pump system.

The individual diagnostic agents A must be capable of solving tasks automatically and autonomously. The main task of a diagnostic agent A consists of detecting malfunctions in its area. For this purpose, it needs, on the one hand, knowledge about its area, realized by use of a model, and, on the other hand, knowledge about its agent environment, that is to say it must know the agents on the basis of whose information it is instructed when carrying out its task. The result of this is that, irrespective of the level in the method hierarchy at which the agent is located, and with which task the agent is entrusted, there is always an identical internal structure, having a fault detection module and a cooperation module. The fault detection module detects deviations which have occurred in the plant in which the process is running, and the cooperation module is responsible for the communication of the agents with one another. The communication is an essential precondition for the functionality of the fault cause determination.

Figure 2:
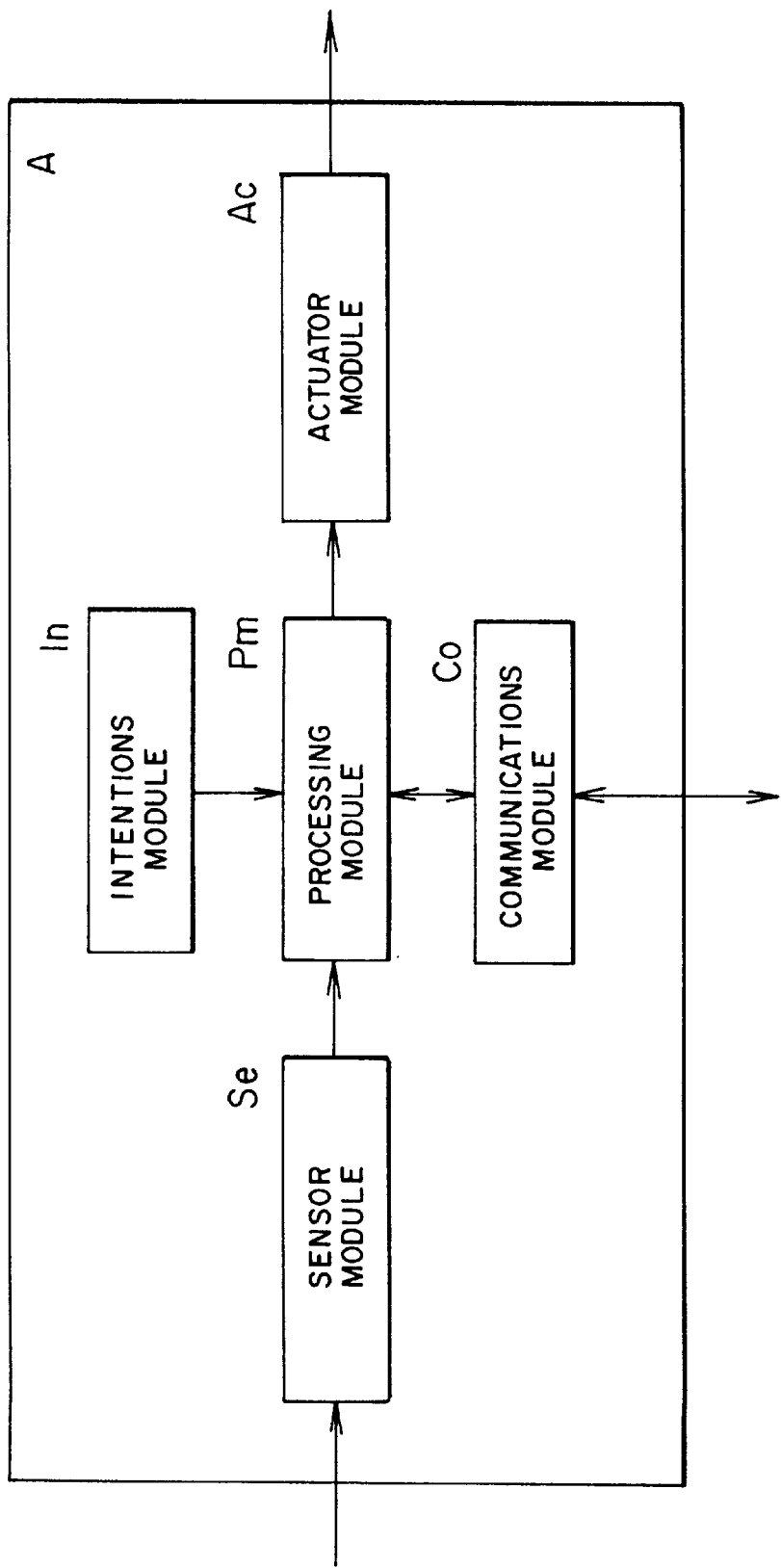
FIG. 2 is a block diagram of an internal structure of a diagnostic agent.

FIG. 2 shows the internal structure of a diagnostic agent A. Using a sensor module Se, the diagnostic agent A receives process values and messages from the distributed control system L or directly from the field instrument 5 to which it is assigned. Using an actuator module Ac, it reacts back onto the process, in that it prescribes set points or sets parameters of the field instruments 5. Diagnostic agents A for which no process interventions are defined do not make use of the actuator module Ac. The knowledge of the diagnostic agent A about the process, its process model, and its objectives, namely the diagnosis to be set up, are combined in a processing module Pm. If more information is needed in order to solve the task, the diagnostic agent A is able to send out messages to other diagnostic agents A by use of a communications module Co. The physical communication of the diagnostic agents A is carried out by a multi-agent system (MAS) protocol, for example the KIF or KQML protocol, via a bus of the control system, for example the Profibus (cf. the cited reference H. J. Müller, Verteilte KL-Methoden und Anwendungen, pages 76 to 81). The processing module Pm contains the above-mentioned fault detection module.

Diagnosis is always attempted locally, that is to say first of all in the smallest units in which fault localization is possible. In particular in the event of the diagnostic agents A being integrated into the intelligent field instruments 5, the data are evaluated "on site". It is thus possible to use the diagnostic agent for self-diagnosis of the field instrument 5. An intentions module In in the diagnostic agent A contains the statement of the tasks and plans of the diagnostic agent A and a description of its place within the multi-agent system MAS.

The methods used for diagnosis are independent of the overall system and can, for example, also be provided by the manufacturer or supplier of a component. The outlay in engineering can be reduced by the fact that the self-diagnosis is tailor-made to the instrument or the component and can be determined irrespective of the system state. The self-diagnosis function can be expanded as far as maintenance requests and information for the purpose of optimization.

For components for which self-diagnosis is not possible, and for all the higher-order control loops, sub-systems or process modules, it is necessary to model the "good" state. The objective of this modeling is to realize a type of triggering function with which further diagnosis at other levels can be initiated. According to experience, the good state of a system in a technical process, that is as complex as that of a power station, cannot be simulated in advance or described in planning data. The most important requirement on the modeling of the good state is therefore that the good state can be learned—for example during the commissioning phase—and further adapted during subsequent operation. Determination of the fault causes has therefore not yet been achieved.

The modeling of good or intended behavior of the respective component to be investigated is performed by neural networks. As a result, it is possible to learn the appropriate process behavior automatically. The modeling is adapted during the initial commissioning and subsequently readapted after changes are made to the plant. If, during subsequent operation, the agent detects that its models no longer agree with the original behavior, the models which are used by the agent for fault detection are assessed with respect to their meaningfulness and automatically readapted and optimized during the observation of a relatively long operating phase.

Figure 3:
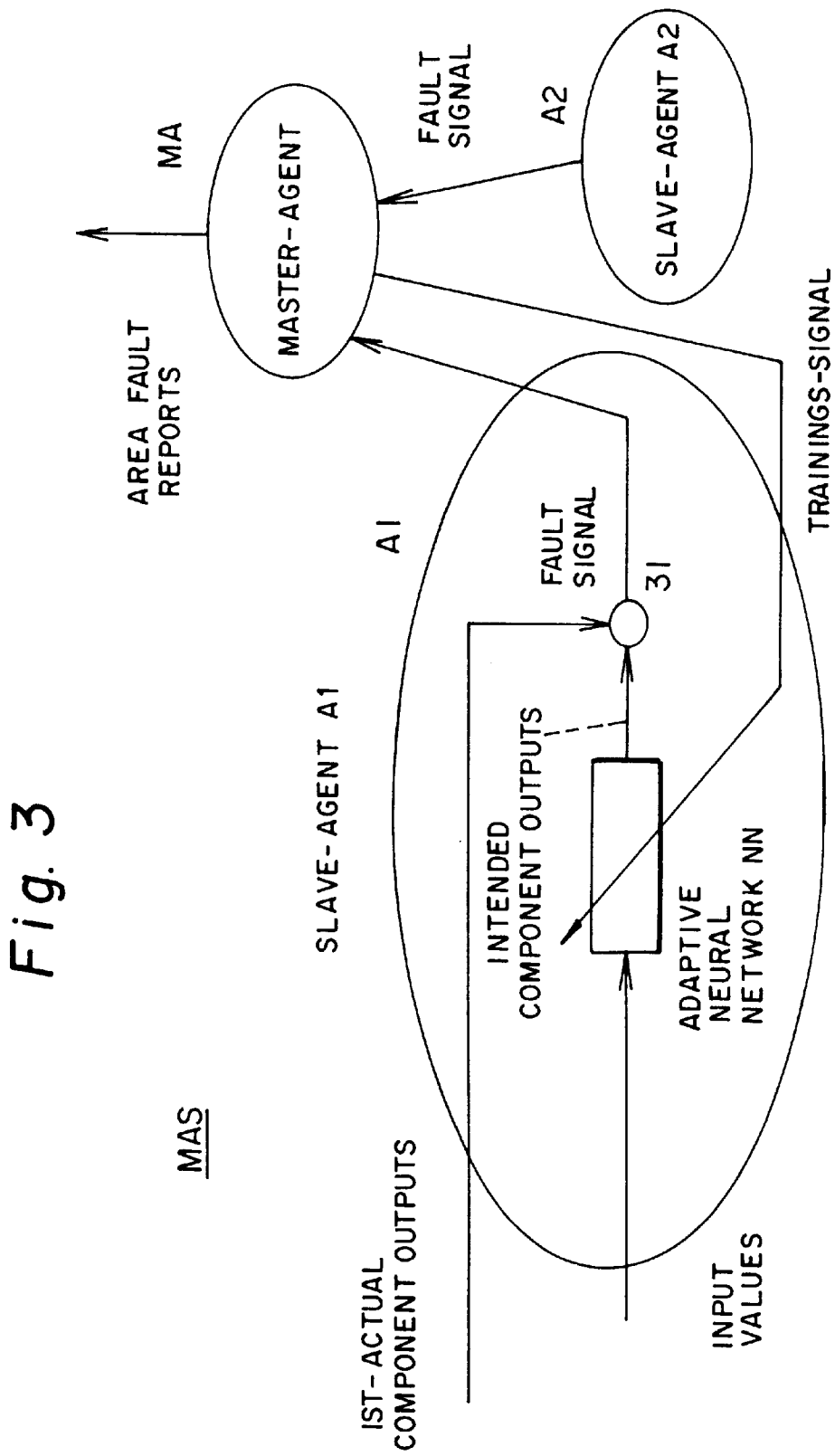
FIG. 3 is a block diagram of a neural network integrated into a fault detection module of the diagnostic agent.

FIG. 3 shows a multi-agent system MAS in schematic form. A master agent MA and a first and second slave agent A1, A2 are illustrated. The master agent MA is to be understood as an agent of higher order in process control terms. In each case, a neural network NN is integrated into all of the agents. "Input values" denote the values used during the initial commissioning phase in which an agent automatically learns the reference behavior of a designated component. "Actual outputs of the component" designate the items of information which the agent receives as actual values during the application phase from the monitored component. "Intended outputs from the component" designate the values which are supplied by the neural network NN on the basis of its knowledge base, and are compared with the actual values at a comparison point 31. A detected deviation is forwarded to the higher-order diagnostic agent MA as a "fault signal". From the entire context, that is to say from the sum of all the fault messages, the diagnostic task is realized in the higher-order agent MA. If no fault has been detected, the higher-order agent MA reports back to the lower-order agent A1, as a "training signal", that there was no process error and that the reference model of the lower-order agent A1 must be adapted to the new behavior. The adaptation can be carried out automatically or manually. In the case of automatic adaptation, the on-line learning of the neural network in the agent A1 is started. In this way, continuous automatic adaptation and improvement to the functionality of the existing plant is achieved. The fault detection is accordingly carried out on the basis of a model, in that the current process image is continuously compared with the process images stored in the neural networks of the individual agents.

Figure 4:
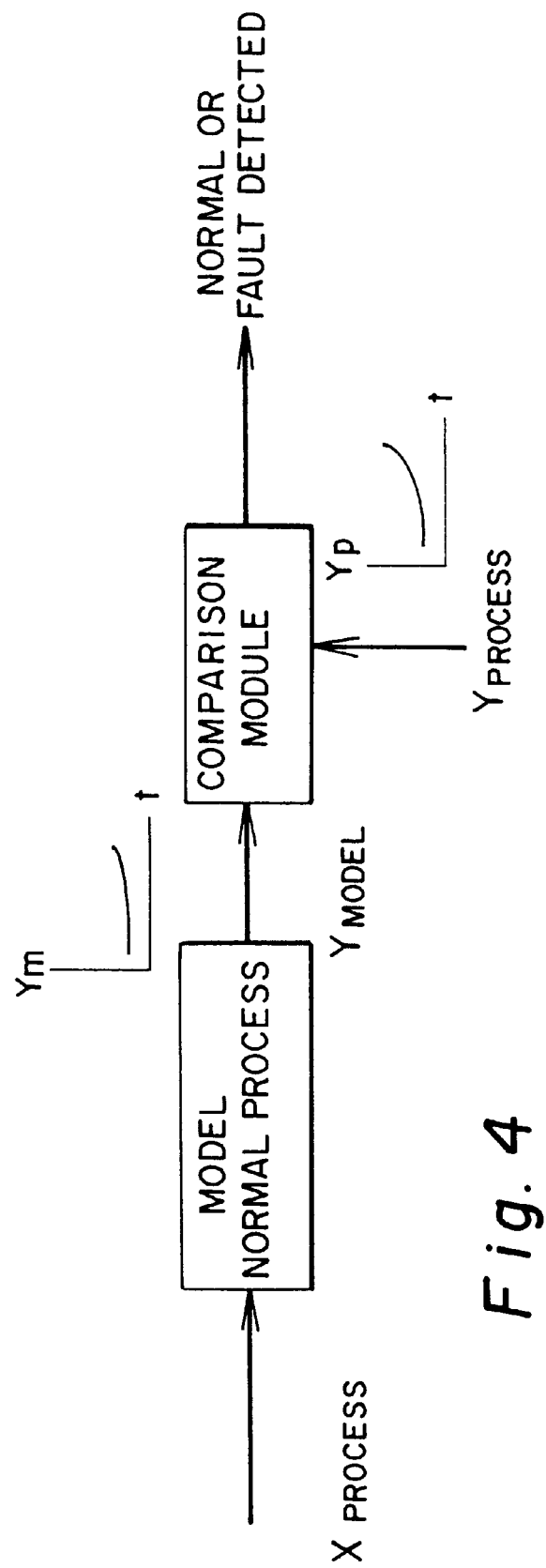
FIG. 4 is a block diagram of a mode of operation for fault detection.

FIG. 4 shows a structure diagram relating to the described fault detection. The distribution of the diagnosis results from the definition of functionally closed regions to which diagnostic agents are assigned. These regions are in turn combined, depending on the application, into a higher process-control hierarchical level to form sub-systems, which are functionally delimited from other systems. The lowest hierarchical level is formed by the intelligent field instruments 5 on the field bus. Since field bus components automatically detect relatively complex tasks, they can also be considered as functional units. The number of hierarchical levels depends on the application.

In terms of their task, the diagnostic agents A are related to one another hierarchically in accordance with the structure of the process technology. They are therefore capable of retrieving data, for example concrete state information from field instruments 5, but also of forwarding information independently to levels of the process control technology that are located further above and hence of advancing the diagnostic process. For this purpose, the diagnostic agents A need knowledge about their position in the process, the physical arrangements and connections of the process parts that are relevant to them, and also knowledge about causal relationships between fault states. It should be emphasized that the hierarchical structure here is selected purely by way of example, but is not a condition.

Figure 5:
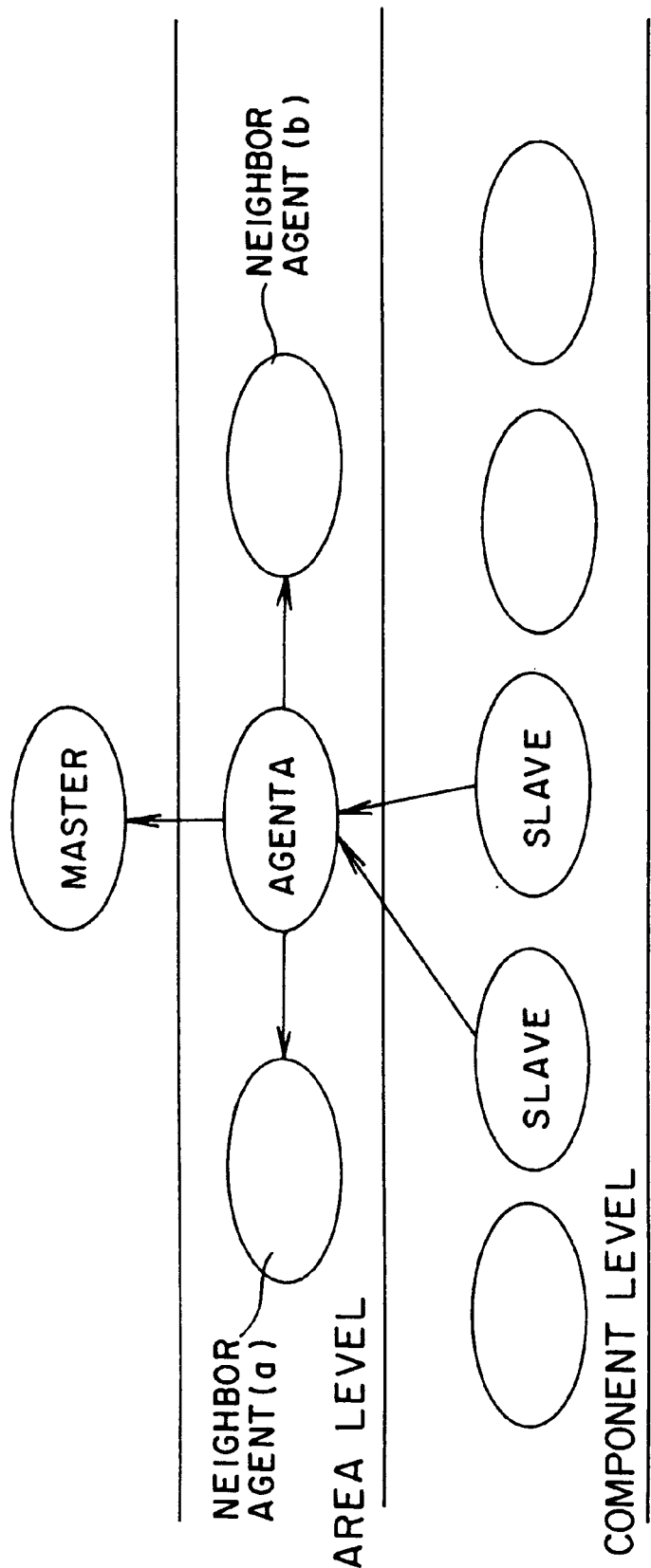
FIG. 5 is a block diagram of components of an agent system.

FIG. 5 shows, by way of example, a devised multi-agent system MAS. On the basis of MAS technology, the system is devised in such a way that it is adaptive with respect to structural changes. For example, if the neighbor agent (a) from FIG. 5 is not available, then agent A must be able to react to this situation. If an additional agent is located into the structure, it is then necessary to inform those agents with which the additional agent will cooperate. This takes place as a result of the fact that the new agent announces itself in the system. Its presence and its capabilities for diagnosis and providing information are thereby known to the multi-agent system. Therefore, it is possible for a newly integrated diagnostic agent to orient itself to its environment and to configure itself in accordance with the requirements of the diagnostic task. This is possible because of the imaging of the process structure in the multi-agent system.

The information technology development of a multi-agent system as a diagnostic system and of the individual diagnostic agents is carried out in accordance with the predefinitions from the field of distributed artificial intelligence. A software development environment that is available on the market can be used. What is important is that the structure of the, for example, hierarchical communications and cooperation structure, as well as the internal structure of the agents in terms of communications capability, formal determination of the tasks, knowledge about the plant and the process, as well as the possible planning of the diagnostic task are known.

The generation of the multi-agent system can be carried out in a largely automated fashion, since the fundamental planning data of the plant can be used for the construction of the communications structure of the multi-agent system. The planning data are generally present in the planning tools of the plant planner and can be made available by being exported via a defined software interface to the multi-agent system. However, it is also possible to build up the communications structure, that is to say the topology of the multi-agent system, by hand. At the same time, the process-control structure is appropriately imaged in the multi-agent system.

Cooperation and communications are significant features of the distributed intelligent systems. The cooperation conditions of distributed diagnostic agents A result from the modeling of the process or of its process control technology. As a result of following the physical structure or the hierarchical organization that is already present in the planning or configuration, the most far-reaching transfer of the appropriate model information from these areas is achieved.

Thus, the necessary knowledge about the structure of the overall multi-agent diagnostic system can be obtained from the planning data of the respective technical plant, and translated directly into the structure of the multi-agent system. The intelligent software agents can be generated in the configuration phase. The agents A have information about their task and their position within the multi-agent system MAS programmed in their intentions module In.

Figure 6:
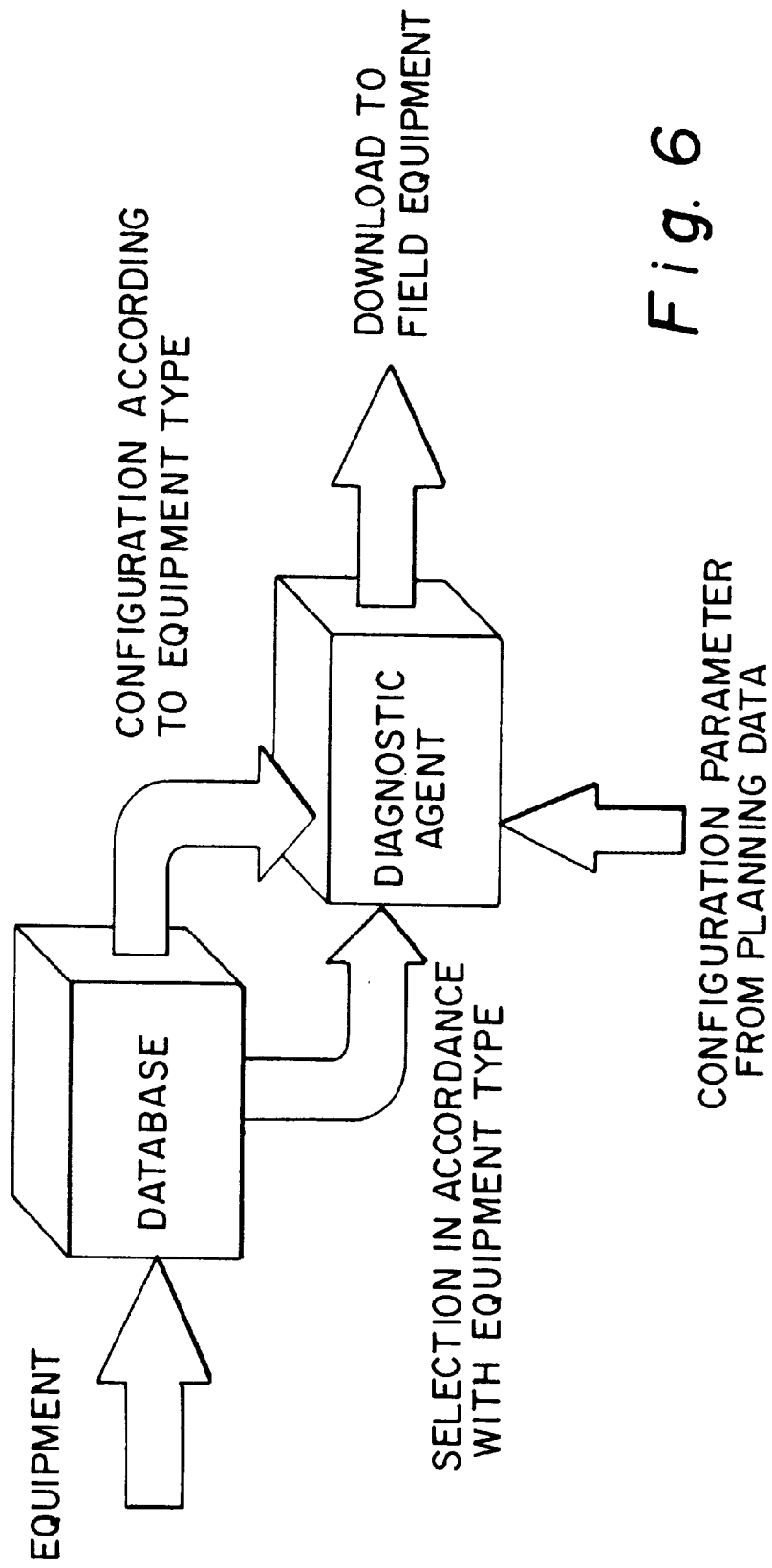
FIG. 6 is a block diagram configuration of the diagnostic agent.

The specific configuration of the individual agents may be derived from the planning data. For agents at the field level, which have no lower-order agents for fault diagnosis, the relevant system information is obtained directly from the field instruments 5. According to the method, the diagnostic agent A at the field level is selected with the aid of available data about the field instrument types present in the system, and is automatically configured or adapted to its environment in combination with the relevant system data. The programming of the corresponding field instrument is then carried out using the configured agent. The illustration in FIG. 6 clarifies the principle. One advantage of the approach is that the manufacturers of the field instruments 5 can be included in the diagnosis configuration process, since the manufacturers, at the same time as supplying the field instruments 5, can also supply the associated agents for fault diagnosis or all the necessary relevant information.

A multi-agent system that is built up in accordance with the principles described above can be used for robust and detailed fault detection. If a diagnostic agent assigned to a subsystem or process module has reported a fault, then it is possible for a more in-depth diagnosis to be initiated for the purpose of further fault localization.

The fault detection of the multi-agent system is carried out step by step, from bottom to top. That is to say that the diagnostic agent A at the lowest level has the task of carrying out a relevance assessment in relation to the process disruption and fault diagnosis using the individual messages supplied by the field instrument in combination with its system information. Depending on the result, a message is sent via the bus system to a higher order diagnostic agent. The monitored actual good behavior of the components and part processes is realized by the neural networks in the agents. Any detected deviations are further reported as shown in FIG. 3.

The higher-order diagnostic agent processes the messages incoming via its sensor and communications module and likewise carries out an assessment, which can also take place through requesting further detailed information from the lower-order agents. The compressed result of the stepwise assessment is output by the agent at the operating and process observation level. The entire system thus arrives at its diagnosis by use of the stepwise information compression. That is to say the distributed diagnostic system satisfies the preconditions for alarm compression and filtering.

At the operating level, only the compressed messages are output, and alarm messages processed during the diagnostic operation are identified as such. However, for reasons of security and for subsequent investigations, they are also stored in a process database and stored over a relatively long term.

As described above, fault detection requires a communications operation in the process-control hierarchy from the bottom to the top and is also used to inform the operator in the control room. The required safety precautions (switching off etc.), if safety limit values are exceeded, are not affected by this.

For the purpose of fault localization, the converse route is followed. At the level at which the fault has been sufficiently detected, the diagnostic agent will initiate the fault localization in lower plant parts closer to the process. Using the knowledge about the detected fault, the diagnostic agents can request the necessary process information and initially separate out or confirm possible causes of disruption.

The method therefore leads to a reduced-engineering diagnosis, since the potential causes for the respective plant disturbances are encoded in the communications structure of the multi-agent system. The communications structure itself results from the planning data that is present in every plant. The MAS technology thus enables the automatic configuration of fault deviations and fault causes.

A further advantage of the method is the optimum adaptation of the multi-agent system to the process control system, for example there are agents associated with the lowest level in the intelligent field instruments 5. These agents have access to all the necessary measured variables for fault determination in their area, that is to say in their field instrument. It is therefore possible for detailed fault diagnoses to be realized. The multi-agent system detects whether there is a fault in the plant and in which areas the fault occurs.

The third significant advantage of the method by comparison with conventional technologies resides in the adaptability since, as a result of using neural networks, an automatic process image of the plant can be learned and the process image, as required, can be adapted incrementally to the plant.

We claim:

1. A process diagnosis system for the diagnosis of processes and states of a technical process controlled by a process control system having a plurality of components, the process diagnosis system comprising:

a multi-agent system structured in accordance with a process and having a plurality of autonomous diagnostic agents distributed over a plurality of components of a process control system controlling the process;

said diagnostic agents each having a sensor module for the acquisition of process values and messages from the process control system, an actuator module for reacting on the process, a communications module for exchanging information between said diagnostic agents, an intentions module for storing task and objective programs of said diagnostic agents, and a processing module connected to said sensor module, said actuator module, said communications module and said intentions module, said processing module storing a process model, storing information about the process and diagnostic tasks and carrying out diagnostic functions; and said processing module having an integrated neural network for learning a reference behavior of the components of the process being monitored and for enabling automatic adaptation to a new reference behavior.

2. The process diagnosis system according to claim 1, wherein some of said diagnostic agents are integrated into some of the components forming intelligent field instruments.

3. The process diagnosis system according to claim 1, wherein said neural network is a network for enabling adaptation of process changes wherein the process changes can be learned automatically without losing relevant process relationships that have already been learned.

4. The process diagnosis system according to claim 3, wherein said neural network is a locally approximating network.

5. The process diagnosis system according to claim 1, wherein said multi-agent system is for diagnosing processes and states of a power station process.

6. The process diagnosis system according to claim 1, wherein the components of the process control system include field instruments and said actuator module prescribes at least one of set points and setting parameters of the field instruments.

7. A method for carrying out a process diagnosis, which comprises:

providing a plurality of diagnostic agents to a process control system for monitoring process components of the process control system during a process, the diagnostic agents including lower order diagnostic agents and a higher order diagnostic agent forming a multi-agent system;

learning in a first commissioning phase reference behavior of the process components of the process to be monitored by each of the lower order diagnostic agents and storing the reference behavior as intended behavior;

determining in an application phase actual behavior of the process components and comparing the actual behavior with the stored intended behavior by each of the lower order diagnostic agents;

reporting any detected deviations in a form of deviation reports to the higher order diagnostic agent by each of the lower order diagnostic agents;

carrying out a diagnosis in the higher order diagnostic agent on a basis of the deviation reports received from the lower order diagnostic agents and on reference behavior stored by the higher order diagnostic agent; and if no fault is detected, reporting with the higher order diagnostic agent to the lower order diagnostic agents that there is no fault present and that a reference model in at least one of the lower order diagnostic agents is to be adapted; and if a fault is detected by the higher order diagnostic agent, reporting the fault with the higher order diagnostic agent to a superior higher order diagnostic agent thereof or outputting a fault report with a reporting device.

8. The method according to claim 7, which comprises automatically adapting each of the lower order diagnostic agents to a new reference behavior if the higher order diagnostic agent releases an adaptation request to each of the lower order diagnostic agents.

* * * * *